United States Patent
Hein et al.

(10) Patent No.: US 10,216,689 B2
(45) Date of Patent: Feb. 26, 2019

(54) COORDINATING MULTIPLE REAL-TIME FUNCTIONS OF A PERIPHERAL OVER A SYNCHRONOUS SERIAL BUS

(71) Applicant: INTEL CORPORATION, Santa Clara, CA (US)

(72) Inventors: Werner Hein, Neubiberg (DE); John Oakley, Bastrop, TX (US); Naveen Kumar Narala, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 14/575,151

(22) Filed: Dec. 18, 2014

(65) Prior Publication Data

US 2016/0179746 A1    Jun. 23, 2016

(51) Int. Cl.
*G06F 13/00* (2006.01)
*G06F 13/42* (2006.01)

(52) U.S. Cl.
CPC .................. *G06F 13/4291* (2013.01)

(58) Field of Classification Search
CPC .... G05B 2219/15099; H04L 12/40084; H04L 12/403; G06F 13/18; G06F 17/30168; G06F 17/30359; G06F 13/366; G06F 13/378; G06F 13/372; G06F 13/3625
USPC .......... 710/301–306, 100, 104–105; 718/100
See application file for complete search history.

(56) References Cited

U.S. PATENT DOCUMENTS

| 6,980,314 B1 * | 12/2005 | McVey | ............... G06F 13/3625 |
| | | | 358/1.15 |
| 2012/0198101 A1 * | 8/2012 | Porcella | .............. G06F 13/4081 |
| | | | 710/12 |

* cited by examiner

*Primary Examiner* — Tim T Vo
*Assistant Examiner* — Kim T Huynh
(74) *Attorney, Agent, or Firm* — Schwabe, Williamson & Wyatt, P.C.

(57) ABSTRACT

Time-critical actions of peripherals sharing a synchronous serial bus can be coordinated flexibly in real time by transmitting the messages through the bus well in advance of the scheduled execution time rather than "just in time." The messages include an action code addressed to the peripheral's shadow register and a time-to-strobe, measured in bus-clock cycles, calculated by a time protocol engine in the system controller and addressed to the peripheral's counting register. The action code is stored in the shadow register while the counting register counts up or down to the time-to-strobe using the bus-clock signal. When the count reaches zero, the action code is written to the function-control register, triggering immediate execution of the action. Because the time-to-strobe can be any number of clock cycles within the counting register's capacity, the transmission timing is decoupled from the execution timing, relaxing transmission-timing constraints.

33 Claims, 6 Drawing Sheets

COORDINATING MULTIPLE REAL-TIME FUNCTIONS OF A PERIPHERAL OVER A SYNCHRONOUS SERIAL BUS

RELATED APPLICATIONS

None

FEDERALLY SPONSORED RESEARCH AND DEVELOPMENT

None

APPENDICES

None

FIELD

Related fields include dedicated baseband/transceiver processors (B/TRs) and their associated hardware, and more particularly handling multiple component functions, which may be simultaneous or otherwise time-critical, over a synchronous serial bus.

DETAILED DESCRIPTION

Figure 1:
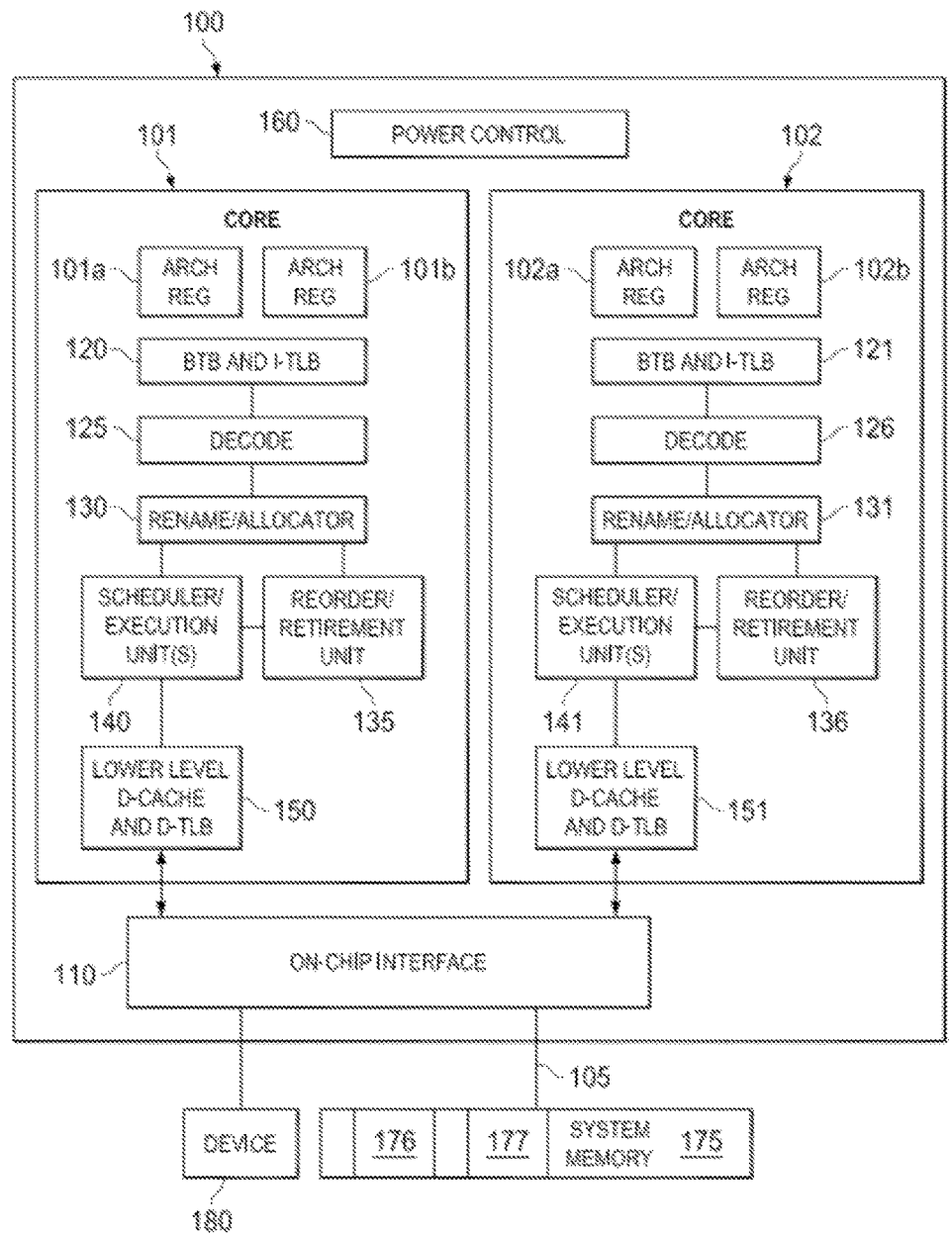
FIG. 1 is a diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth preferences are met for optimal component operation. Furthermore, different market segments demand different aspects of interconnect architectures to suit the market's needs. For example, servers intend higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Note that the apparatus, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be asymmetric or symmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Allocator and renamer block 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further away from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as a multi-drop bus, point-to-point interconnect, serial interconnect, parallel bus, coherent (e.g. cache coherent) bus, layered protocol architecture, differential bus, or a GTL bus.

Memory 175 may be dedicated to processor 100 or shared with other devices in a system. Common examples of types of memory 175 include DRAM, SRAM, non-volatile memory, and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. In some implementations, during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Systems and methods of the present disclosure include transmitter devices. The transmitter devices include a high-speed driver domain having a low-dropout regulator. The low-dropout regulator reduces a voltage level from an input voltage source to the high-speed driver domain. In addition, the transmitter devices include a low-speed driver domain.

The low-speed driver domain includes a pre-driver which reduces a voltage level from an input voltage source to the low-speed driver domain.

New electronic devices are under constant market pressure to provide more and more versatility in a smaller space while using less power. For example, a smartphone that fits easily in the hand may be equipped to transmit and receive cellular signals, WiFi signals, GPS signals, short-range signals, and FM radio signals. Each of these transceiver modules may need to be connected to the application processor. Preferably, enough physical space is allocated to the interconnections to produce a satisfactory signal quality. Smartphones and tablets, as portable wireless devices, benefit greatly from reducing power consumption and thereby extending battery life.

Each type of signal may be transmitted and received at more than one rate. For example, each signal may include both low-rate traffic (e.g., audio) and high-rate traffic (e.g., WiFi). In many applications, a low-rate link is intended to be available at all times. Traditionally, separate bidirectional buses have been provided for the different data rates. For example, in some multiple communications ("multi-com") chipsets and system-on-chip ("SoC") devices, industry standard Synchronous Backplane Interconnect (SBI), Inter-Integrated Circuit ($I^2C$) or Universal Asynchronous Receiver/Transmitter (UART) buses are provided for low-rate traffic, and either standard Peripheral Component Interconnect Express (PCIe) or Universal Serial Bus (USBx) buses or proprietary buses are provided for high-rate traffic. Pairs of these low-rate and high-rate bidirectional buses may connect multiple cores and other chipset components on SoCs.

Alternative shared-bus embodiments of the solutions are applicable not only to multi-com chips but also to ARM-based SoCs and system-level external bus interfaces such as PCIe, Secure Digital Input/Output (SDIO), Mobile Industry Processor Interface Low Latency Interface (MIPI LLI), etc. Various embodiments save power, improve cost structure of cost-sensitive devices, reduce footprint, improve connectivity, and enable a wider range of form factor designs.

Electronic devices that perform some or all of their functions by digital processing may include two or more physically separate microcontrollers, with each microcontroller controlling one or more peripherals. A microcontroller includes at least: (1) an arithmetic logic unit; (2) program-count, stack-pointer, and status registers; (3) temporary data-storage registers for non-final computation results; and (4) message decoder, microcontroller control logic, and one or more handle resets or interrupts.

The terms "microcontroller" and "peripheral" originally referred to hardware residing in separate pieces of equipment, such as a desktop computer tower and its printer. The meanings of the terms have broadened with the evolution and miniaturization of technology. They now may also refer to connected boards in the same piece of equipment (e.g., motherboard and sound card); chips on the same board; or, most recently, components on the same chip, for example in system-on-chip (SoC) hardware. In some systems, two or more microcontrollers and/or two or more peripherals may be located on a single chip.

The use of multiple microcontrollers can confer several advantages. Multiple microcontrollers can control different peripherals, or different parts of the same peripheral, simultaneously. In some cases, the parallel processing made possible by separate microcontrollers increases the speed of computation-intensive tasks (e.g., graphic animation) or facilitates multitasking. In other cases, a safety-critical or otherwise highly regulated function may be given its own dedicated microcontroller, physically separated from the application processor, which helps prevent changes in other functions (executed on one or more other microcontrollers) from potentially affecting processes executed by the dedicated microcontroller. Thus the device is subject to regulatory re-certification only when the firmware on the dedicated microcontroller(s) is changed, rather than every time any of its firmware is changed.

One application of a dedicated microcontroller is to perform time-critical actions. Time-critical actions intend for a microcontroller or peripherals to respond to certain incoming signals within a predetermined interval of time, and/or to produce certain outgoing signals at predetermined intervals (e.g., every 10 minutes) or at predetermined external ("real") times (e.g., at 5 PM local time). Time-critical processes may benefit from running on a specialized real-time operating system (RTOS) rather than the type of general-purpose operating system used in application processors (e.g., iOS® or Android®).

A dedicated microcontroller may run an RTOS tailored to its specific actions. The commands for executing the actions may be transmitted from the dedicated microcontroller to the peripheral over a synchronous serial bus (SSB). Interface standards for such buses include, but are not limited to, Inter-Integrated Circuit ($I^2C$), Serial Peripheral Interface (SPI), Series Voltage Identification (SVID), and Radio Frequency Front-End (RFFE). The dedicated microcontroller sends command signals over the SSB that cause programming (overwriting) of one or more registers in the peripheral. The command signals include structured telegrams that may include a "type" designation, a "header" (e.g., the address of the register to be programmed), and a "payload" (the data to be put into the register). Typically, function-control registers are overwritten with the incoming payload immediately after the peripheral receives the telegram, and the changed register values trigger an immediate action of the peripheral.

Some systems intend for multiple time-critical actions to be performed simultaneously or very nearly so (e.g., within a few microseconds) on one or more peripherals. Sending the messages for such "overlapping" actions in parallel would be straightforward with a sufficient number of interconnects between the dedicated microcontroller and the affected peripheral(s). However, space constraints or other priorities may limit the number of interconnects. For example, the number of balls in a ball-grid array (BGA) is limited by the size of the overlying component and the spacing expected to avoid crosstalk. In some devices, a dedicated microcontroller may control several (or all) of its peripherals through a single shared SSB. When multiple time-critical actions overlap, the telegrams may still be sent serially through the bus. If the timed telegrams become too numerous and/or their intended real times are too closely spaced, one or more real-time constraints may be violated or the overloaded serial bus may stall. Yet at other times the serial bus may be idle.

In summary, the constraints on time-critical actions may come into conflict (1) at times that two or more time-critical actions are intended to start nearly simultaneously, (2) when telegrams, each taking a finite time to transmit, may be sent sequentially down a single serial bus, and (3) at times that telegrams for time-critical actions may be sent just before the actions are to be performed, because the changes take effect immediately after a telegram is received at the peripheral. Relaxation of constraint (1) may degrade device performance. Relaxation of constraint (2) may involve more interconnects (e.g., BGA balls) and sufficient space for them, which may make the device too expensive or force it into an undesirable form factor. However, constraint (3) is often not a design constraint, but merely a default behavior that may be changeable without a negative impact on the system. If telegrams for time-critical tasks could be sent in advance (for instance, while the SSB is otherwise idle) and then prevented from taking effect until the intended time of the task, multiple time-critical tasks could be triggered within a very short time interval from within the peripheral(s) without requiring further signal traffic on the SSB.

Most of the following examples in this Description relate to dedicated microcontrollers for RF transmission and reception. In some countries, including the US, RF transmission is heavily regulated; RF-emitting devices may receive certification involving rigorous testing, and may be subject to re-certification after any change that could affect the RF emissions. In addition, many RF devices may continue transmitting and/or receiving signals while simultaneously performing other tasks such as responding to user input. However, the described techniques may be used where any RTOS microcontroller controls one or more peripherals.

Figure 2A:
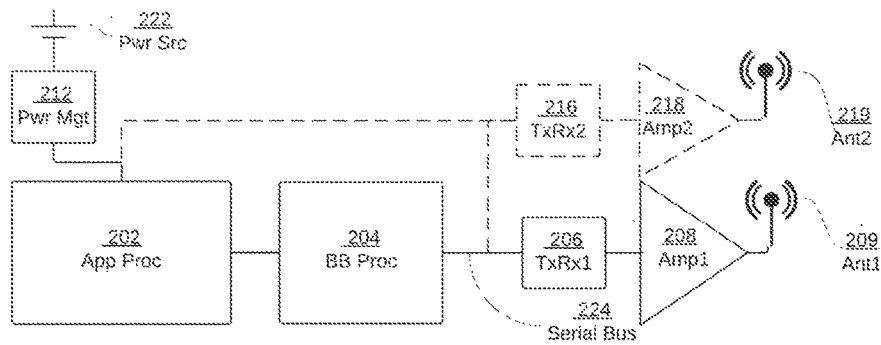
FIGS. 2A-C illustrate examples of multiple time-critical actions on peripherals sharing a serial bus.
Figure 2B:
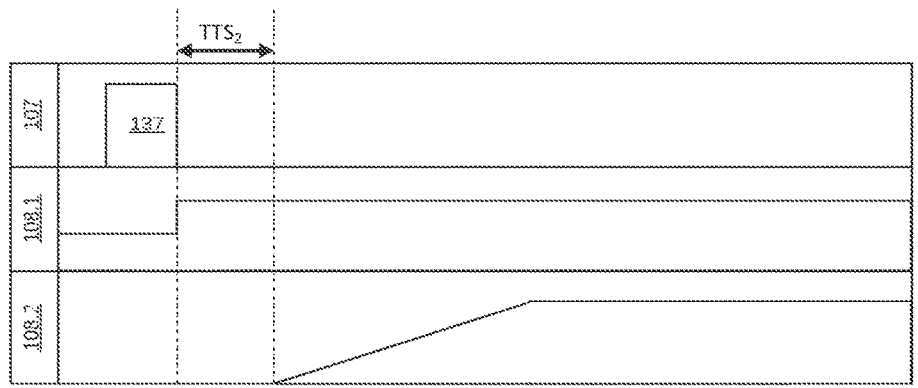
Figure 2C:
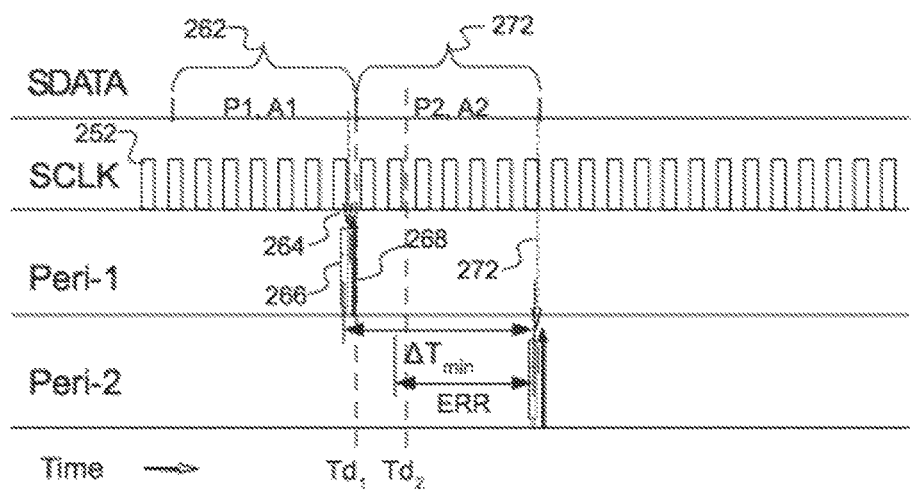

FIGS. 2A-C illustrate examples of multiple time-critical actions on peripherals sharing a serial bus. FIG. 2A is a simplified block diagram of a portion of a telecommunications device. Some or all of the blocks may be integrated modules fabricated on the same chip, or they may be separate chips interconnected on a circuit board.

Application processor 202 runs an application operating system. The communication hardware, however, is controlled by baseband processor 204. This leaves the manufacturer free to change many aspects of application processor 202; as long as no changes are made to baseband processor 204, regulatory re-certification is not an issue. In some embodiments, baseband processor 204 may run some type of RTOS.

Baseband processor 204 controls transceiver 206, amplifier 208, antenna 209, and any other suitable communication hardware through serial bus 224. In some embodiments, baseband processor 204 may control hardware for multiple communication channels. As well as transceiver 206, amplifier 208, and antenna 209, one or more additional transceivers 216, their amplifiers 218, and their antennas 219 may be controlled by a baseband processor 204 through serial bus 224. In these configurations, baseband processor 204 may be referred to as a "bus master" or a "system controller," and the devices controlled by baseband processor 204 through serial bus 224, such as transceivers 206 and 216, may be referred to as a "bus client" or "peripheral." In some embodiments, application processor 202 and one or more auxiliary processors such as baseband processor 204 may be powered by a shared power source 222 and a shared power-management module 212.

Often, multiple actions may be performed simultaneously, or very close in time (e.g., a few microseconds) by low-level components of one or more multiple peripherals sharing a single serial bus as illustrated in FIG. 2A. For example, a setting change on a power amplifier's input switch may need to be closely followed (or closely preceded) by a DC/DC converter ramping up the amplifier gain.

FIG. 2B is a timing diagram illustrating an example of such "time-critical" actions, the effectiveness of which depends on execution in a desired order, at a highly accurate time or within a very precise time interval. Pulse 237 in system-controller swim-lane 207 represents a trigger signal received by the system controller; for example, a command from the application processor as part of the running of the application, or a signal from a clock or timer that it is time to perform a scheduled action. The switching action in peripheral component swim-lane 208.1 is intended to occur at a deadline time $T_{d1}$ coincident with the falling edge $T_0$ of pulse 237, while the ramping action in peripheral component swim-lane 208.2 is intended to commence at a deadline time $T_{d2}$, which is later than the falling edge $T_0$ of pulse 237 by a predetermined "time-to-strobe" $TTS_2$. Note: for the purposes of this document, the "deadline time" of a time-critical action is the exact time when the action is intended to be executed; the action will be unsuccessful if executed either later or earlier.

The actions may be executed at the peripherals by programming, or "writing to," function-control registers in the power amplifier and the DC/DC converter. Commonly, function-control registers execute actions immediately after being programmed. Therefore, one approach has been for the system controller/baseband processor to delay sending the messages to the peripheral to until just before the deadline time; the message only has time to travel through the bus and be written to the peripheral's function control register before the deadline time. This "just in time" approach may encounter, among others, the following two challenges:

First, if many devices are being controlled by the same serial bus, the bus may experience some high-traffic times and some idle times. If the deadline time occurs in a period of high traffic, the system-controller preferably determines how the message for the time-critical action can be sent within an extremely narrow window of time without compromising other functions.

Second, if messages may travel through the bus in series, a minimum is imposed on the time interval between two consecutive actions by the amount of time it takes the system controller to transmit the second action to the bus. FIG. 2C is a timing diagram illustrating this effect. The second line, "SCLK," illustrates ticks 252 of the bus clock. For visibility, the tick length is exaggerated; as of this writing, bus clocks may operate at frequencies between several kHz and several hundred MHz. The top line, "SDATA," illustrates messages transmitted to the bus by the system controller.

In this example, the messages are single telegrams including, possibly among other things, the address of the peripheral assigned to perform the action (P1 or P2), and the identifier for the action (A1 or A2). The telegram length 262, 272 is proportional to the number of clock-ticks the system controller takes to transmit the telegram to the serial bus. A1 is a time-critical action with deadline time $T_{d1}$; A2 is a time-critical action with deadline time $T_{d2}$. The first telegram of length 262 is sent "just in time," so that it is received at the first peripheral (Peri-1) at time 264 and written to the function control register at time 266, which immediately (at time 268) executes action A1 at deadline time $T_{d1}$. Now, though, the second telegram has a length 272, and, because of the serial nature of the bus, the earliest it can begin to be transmitted is directly after the end of the first telegram of length 262. Therefore, the earliest time that action A2 can be received and executed is time 274, which is later than $T_{d2}$ by a timing error ERR. The length 272 of the second message thus corresponds to a minimum time-to-strobe $\Delta T_{min}$. Actions sent "just in time" directly to function control registers can never be executed closer together than $\Delta T_{min}$.

Figure 3:
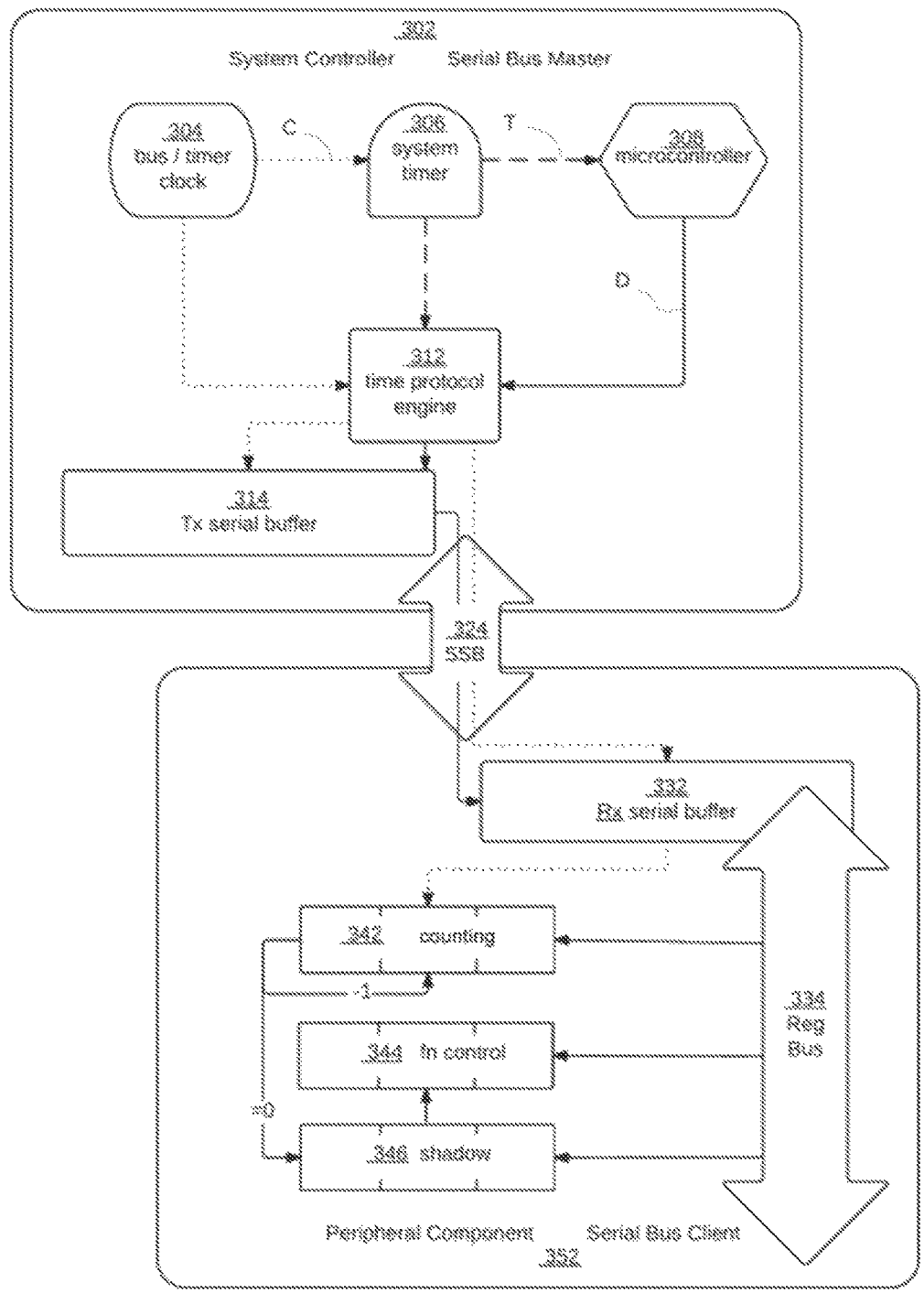
FIG. 3 is a block diagram of an exemplary dedicated microcontroller controlling an associated peripheral over a synchronous serial bus (SSB).

FIG. 3 is a block diagram of an exemplary dedicated microcontroller controlling an associated peripheral over a synchronous serial bus (SSB). SSB 324 links system controller (or "serial bus master" 302 to peripheral (or "serial bus client") 352. For simplicity, only one peripheral 352 is illustrated, but in practice an SSB 324 may link a single system controller 302 to any practical number of peripherals 352. System controller 302 includes a source of a clock signal C (the dotted-line arrows) which functions as the bus clock and the timer clock. A clock signal C may originate from a clock 304 inside system controller 302 as illustrated. Alternatively, clock signal (dotted-line arrows) C may come to system controller 302 from an external location. A system timer 306 uses clock signal C to constantly update a time value it sends out as timer signal T (the dashed-line arrow). Timer signal T may or may not be adjusted to match local time outside the device. Microcontroller 308 uses the timer signal T to generate a data signal D (the solid-line arrows). Data signal D includes all the time-critical messages for the peripherals, with deadline times derived from timer signal T. In addition, microcontroller 308 also generates messages that are not time-critical.

Time protocol engine 312 receives the data signal D for microcontroller 308, a timer signal from system timer 306, and a clock signal from bus clock 304. In time protocol engine 312, deadline times in data signal D are converted on the fly to relative numbers of clocks signals from "right now" (the time at which time protocol engine 312 releases the data to transmission serial buffer 314) to the deadline time. To help time protocol engine 312 recognize deadline times within the stream of data signals D, an identifier signal may precede the deadline times. The identifier signal may be as simple as a single periodic bit set to one value (e.g., 1) when preceding a deadline time and to the other value (e.g., 0) when preceding other types of data. In some embodiments, time protocol engine 312 passes all non-deadline data without alteration. In some embodiments, time protocol engine 312 strips the identifier signals, which are no longer needed, before releasing the data to transmission serial buffer 314. Time protocol engine 312 may forward the clock signal C to a shift-register of transmission serial buffer 314 and to SSB 324.

In some embodiments, time protocol engine 312 keeps track of the latest deadline time received, either as a system time in or a number of clock signals out, and microcontroller 308 continues to transmit clock signal C until the latest deadline time has passed, rather than turning off clock signal C after a telegram transmission.

In some embodiments, transmission serial buffer 314 may be first-in, first-out (FIFO). Alternatively, it may provide a separate path for high-priority signals, such as messages with imminent deadline times, so that, if desired, they may be sent to SSB 324 ahead of lower-priority traffic. SSB 324 also carries a clock signal C, which may come through transmission buffer 314, through time protocol engine 312 as illustrated, or directly from bus clock 304. Structured signals passing through SSB 324 may be referred to as "telegrams," because they take time to transmit and receive from beginning to end.

Among the components of peripheral 352 will be a reception serial buffer 332. In some embodiments, the peripheral can recognize different types of telegrams and hold certain types in reception buffer 332 while forwarding others for immediate processing. From reception buffer 332, the data travels through register bus 334 to various destination registers. Counting (either count-down or count-up) register 342, which has access to the bus clock signal C, receives the deadline times converted to numbers of clock cycles and immediately begins counting up or down from those numbers. The count depends on the peripheral's sensing the bus clock signal, or compensating for predictable pauses, hence the preference in some embodiments to continue the clock signal C unless none of the counting registers in any of the peripherals are finished counting. The actions to be performed at the deadline times, instead of being written directly to function-control register 344, are initially written to shadow register 346. Shadow register 346 has no immediate reaction to being written and simply stores the action data while counting register 342 counts up or down.

When counting register 342 reaches a triggering value (e.g., zero), it triggers the copying of the action data from shadow register 346 to function-control measure register 344. The count reaching the triggering value signifies the deadline time has arrived. Function-control register 344 immediately executes any action written to it; therefore the action is triggered exactly at the deadline time.

In the illustrated system, the action has a place in the peripheral where it can wait without being executed (i.e., the shadow register 346, or in some embodiments the reception buffer 332). The action also arrives accompanied by information on how many clock cycles will pass until deadline time when it will be executed. Therefore, the action no longer needs to be kept back until just before its deadline time, but may be sent almost any time before the deadline time for holding until the deadline time arrives. For example, time-critical action telegrams may be sent during idle periods on SSB 324, easing congestion and reducing the possibility of error during high-traffic periods. Counting registers, if not already present in the peripheral, are fairly easy and inexpensive to add, and compatible with the relatively simplified logic customarily used for peripherals.

Figure 4A:
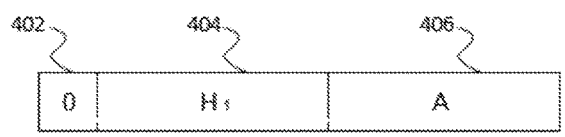
FIGS. 4A-E are graphical representations of exemplary telegrams generated by a microcontroller, processed by a time protocol engine, and sent to a peripheral.

FIGS. 4A-E are graphical representations of exemplary telegrams generated by a microcontroller, processed by a time protocol engine, and sent to a peripheral. FIG. 4A is an example of a "standard" telegram carrying a message for an action that is not time-critical (i.e., it has no deadline time) as initially generated by the microprocessor. In this example, initial bit 402 flags the "type" of the telegram, (time-critical or timing-noncritical) and shall be referred to as the "T-bit." In this example set, the T-bit is 0 for a timing-noncritical telegram and 1 for a time-critical telegram, but in some embodiments the reverse may be true or other values or bits may be used to the same effect. The telegram may also include a header 404 (for example, an address $H_1$ of the peripheral and a target register within the peripheral) and a data payload 406 including action code A to be written to the target register to cause the peripheral to perform an action.

Figure 4B:
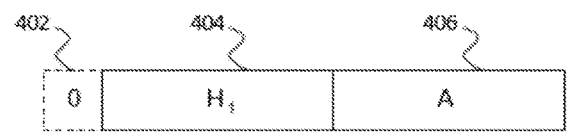

As discussed with reference to FIG. 2, newly generated telegrams from the microprocessor enter the time protocol engine. FIG. 4B represents a possible embodiment of the timing-noncritical telegram being sent to a transmission buffer after being processed by the time protocol engine. Header 404 and payload 406 are not modified. In some embodiments, T-bit 402 may be deleted (signified by the dotted outline), since it will not be needed downstream. However, the approach will still work even if the T-bit is not deleted.

Figure 4C:
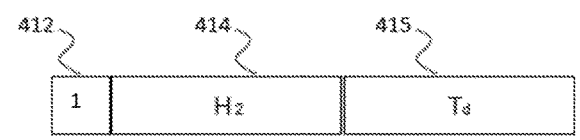

FIG. 4C is an example of a time-critical telegram as initially generated by the microprocessor. It includes a T-bit 412 with a value that is only used for time-critical telegrams (in this illustration, 1). Header 414 may include the address $H_2$ of the peripheral and a counting register in the peripheral. Payload 415 includes the deadline time $T_d$ expressed as a system time.

Figure 4D:
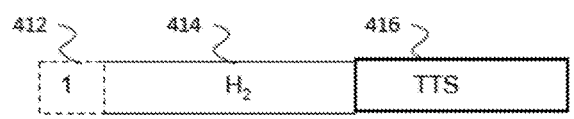

FIG. 4D is an example of the time-critical telegram after processing by the time protocol engine. As with a timing-noncritical telegram, T-bit 412 may be deleted, or not, depending on the embodiment. The time protocol engine may pass peripheral counting-register address $H_2$ along without modification. The time protocol engine notes the system time Ts coming in on the timer signal and a clock frequency on the clock signal, and initially converts the deadline time $T_d$ to a time-to-strobe ($TTS_{@send}=T_d-T_s$). $TTS_{@send}$ is the number of clock cycles until the deadline time $T_d$ from the system time when the telegram is loaded from the time protocol engine into the transmission buffer. Preferably, though, the TTS should reflect the TTS as of its arrival at the peripheral receiver. accounting for the travel time $T_t$ while the telegram is loaded into the bus, transported to the peripheral, and its payload to written to the target register. At least the first order, $T_t$ is proportional to the length of the telegram, so the time protocol engine can measure the length and use it to calculate $T_t$ synchronously with the bus clock. The TTS output from the time protocol engine is $TTS=TTS_{@send}-T_t$.

Figure 4E:

FIG. 4E shows the pair of telegrams sent by some embodiments for each time-critical action. Using two telegrams is one way to route the TTS to a counting register and the action A to a different register, such as a shadow register. The action telegram has a header 404 that includes the peripheral and target register (e.g., shadow register) address $H_1$ and the payload 406 that includes the action data A to be written to the shadow register. The counting has a header 414 including the peripheral and target-register (e.g., counting register) address $H_2$, while payload 416 includes the time-to-strobe TTS to be written to the counting register.

Figure 5:
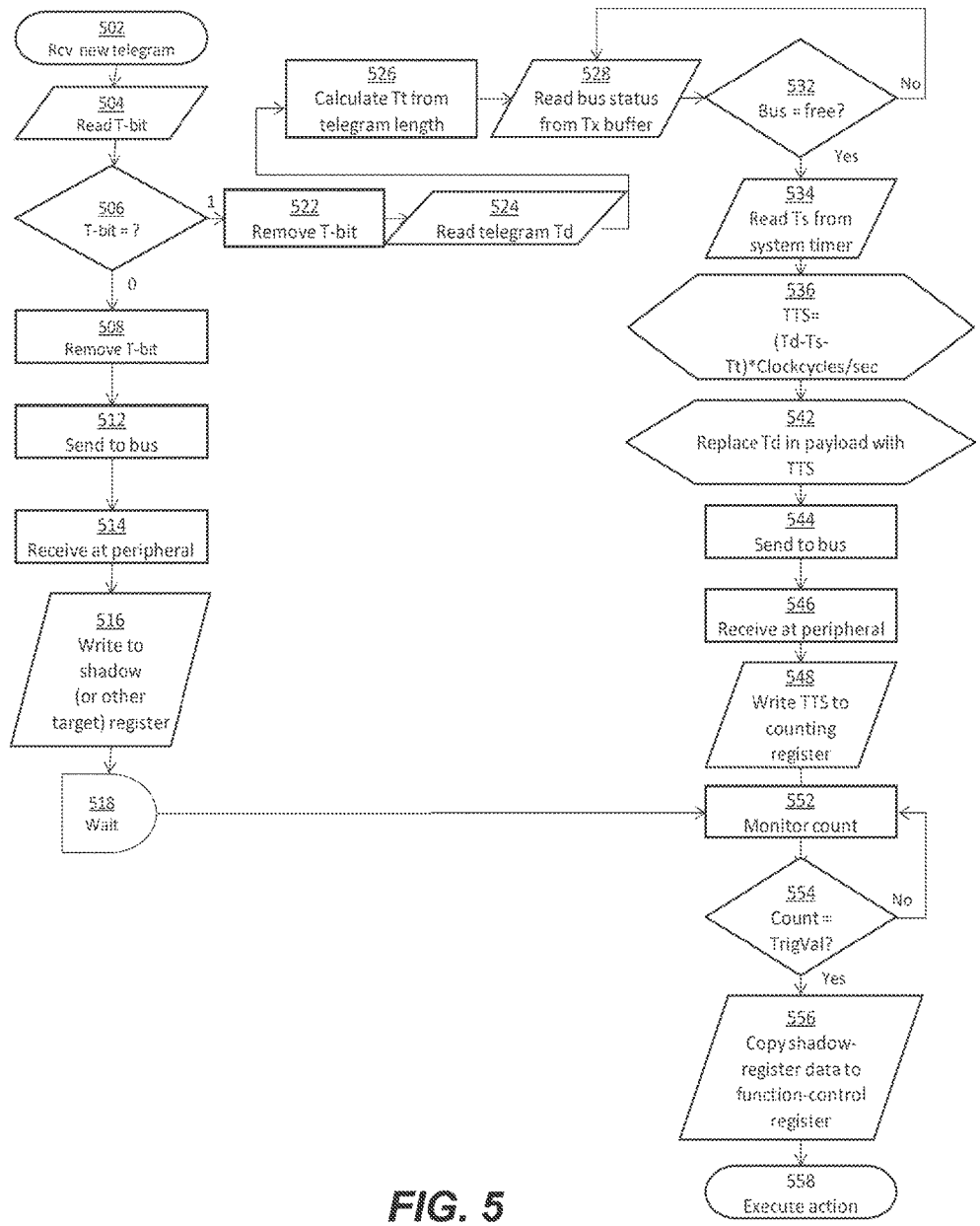
FIG. 5 is a flowchart of an example of telegram processing in a time protocol engine and subsequent actions at the receiving peripheral.

FIG. 5 is a flowchart of an example of telegram processing in a time protocol engine and subsequent actions at the receiving peripheral. In step 502, the time protocol engine receives a new telegram from the microcontroller. In step 504, the time protocol engine reads the T-bit to determine whether this telegram is time-critical. Continuing with the example of FIGS. 4A-E, finding a T-bit=0 at decision point 506 means that the telegram is not time-critical, i.e., that it does not contain a deadline time. In some embodiments, the time protocol engine may remove the T-bit in step 508, shortening the telegram so that it may be sent faster. However, the system and method will still function if the T-bit is not removed. The remainder of the telegram is sent to the synchronous serial bus (SSB) in step 512 and received at the peripheral in step 514. If the telegram is for a time-critical action, it is written to the shadow register, the address of which is part of the telegram header. If instead the telegram carries some other data, it may be written to a different register addressed in the header.

Unlike the function-control register, the shadow register does not automatically cause the peripheral to execute any action written to it. An action written to the shadow register can instead be stored for a wait time 518.

Going back to decision point 506, if the T-bit=1, it may be removed in step 522 at any time before being sent to the transmission buffer and onto the bus, or in some embodiments it may be left in place. The deadline time $T_d$ contained in the telegram is read at step 524. Based on the telegram's length, the expected travel time $T_t$ is calculated at step 526. In some embodiments, the time protocol engine then examines the transmission buffer to determine the status of the SSB (free or busy). If the bus is busy, the telegram cannot yet be sent, and it is not known with precision when the bus will become free to allow the telegram to be sent. Therefore, the time protocol engine loops back and continues to monitor the transmission buffer for bus status as long as the bus appears busy at decision point 532. On the other hand, if the bus is free at decision point 532, the time protocol engine reads the current system time $T_s$ from the system timer at step 534 and calculates the time-to-strobe $TTS=T_d-T_s-T_t$ in clock cycles per second (or other unit of system time). The time protocol engine replaces deadline time $T_d$ in the telegram payload with time-to-strobe TTS in step 542 and sends the telegram through the transmission buffer to the bus in step 544. A constant number of clock cycles (in some embodiments, only one), pass between completing the on-the-fly TTS calculation of step 542 and transmitting the first bit in step 544.

At step 546, the TTS telegram is received at the peripheral. If the value in the counting register is zero, the counting register is overwritten with the TTS and the value begins decreasing by a constant decrement for each clock cycle. The peripheral monitors the counting register at step 552. As long as the counting register contains a value greater than zero at decision point 554, the peripheral simply continues to monitor the count. When the value in the counting register reaches zero (signifying that deadline time $T_d$ has arrived for the action stored in the shadow register), the peripheral copies the action code in the shadow register to the function-control register at step 556, triggering the immediate execution of the action exactly at the deadline time.

In some embodiments, the microprocessor of the system controller keeps track of all actions still pending and their deadline times, and maintains the bus clock signal to the peripherals until the last deadline time is past. In some embodiments, the system controller may keep the bus clock running continuously. Many existing SSBs already tolerate clock signals that exceed telegram length.

With the shadow register storing the time-critical action and the counting register given the number of clock cycles before the action's deadline time, the peripheral is equipped to execute the action exactly at the deadline time autonomously; there is no need for further communication from the system controller in order to execute that action on time. Time-critical action messages can thus be sent at any suitable time before the deadline time, limited only by the size of the counting register (the more bits in the counting register, the earlier the telegrams can be sent.

The flexibility conferred by the decoupling of register programming from action execution reduces the importance of transmitting time-critical actions from "highest" to "medium" or "low." Unlike some other approaches, this system does not need extra strobe telegrams or strobe signals. This process does not interfere with other traffic on the bus; on the contrary, enables the bus to tolerate more traffic in general, including time-accurate telegrams. The relaxation of the real-time constraints can allow more peripherals to share the same bus, allow the bus to function at a lower speed so that the bus clock rate accommodates the desired timing precision.

Figure 6A:
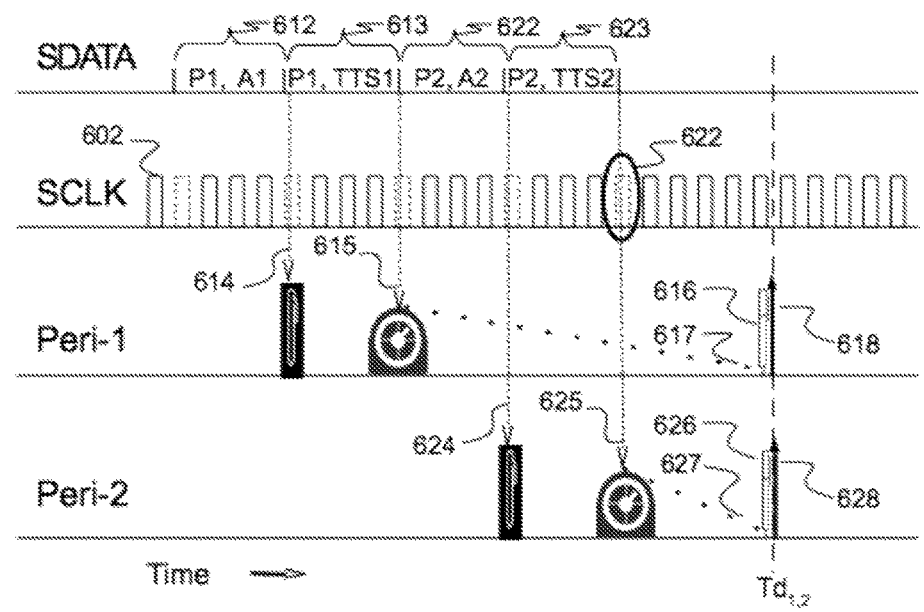
FIGS. 6A-B are schematic timing diagrams illustrating how the pre-loading process may enable closely-timed execution of multiple time-critical functions sent through a serial bus.
Figure 6B:
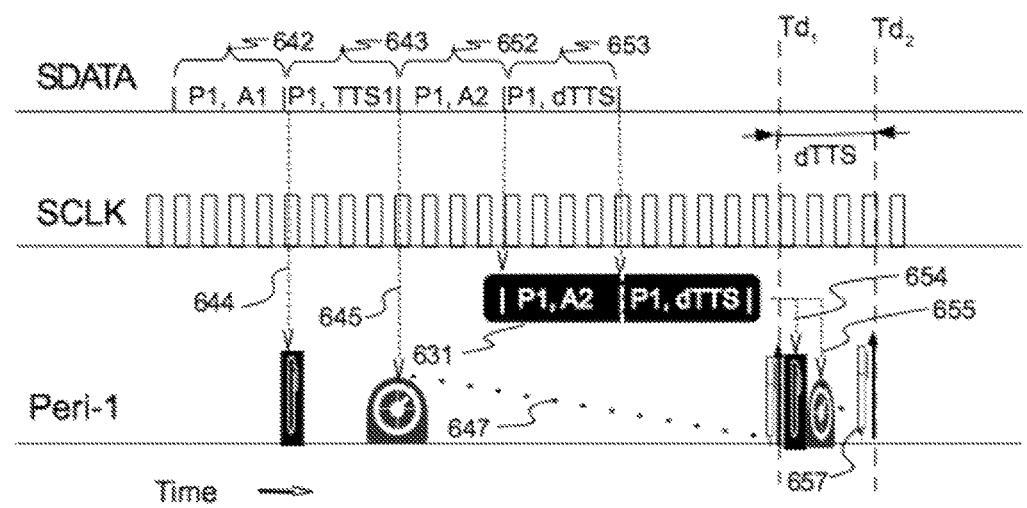

FIGS. 6A-B are schematic timing diagrams illustrating how the pre-loading process may enable closely-timed execution of multiple time-critical functions sent through a serial bus. FIG. 6A illustrates one of the extreme cases of closely-timed actions on different peripherals: where the actions are intended to be simultaneous at a single deadline time $T_{d1, 2}$. The top "SDATA" row illustrates the two pairs of telegrams sent from the system controller: action telegram 612 for the shadow register of peripheral 1, TTS telegram 613 for the counting register of peripheral 1, action telegram 622 for the shadow register of peripheral 2, and TTS telegram 623 for the counting register of peripheral 2. The "SCLK" row shows the bus-clock cycles 602, with exaggeratedly low frequency to aid visibility. The two bottom rows illustrate what happens at peripheral 1 and peripheral 2.

Action telegram 612 arrives at peripheral 1 where its payload, action A1, is written to the shadow register at time 614. Then TTS telegram 613 arrives at peripheral 1 where its payload, number of clock cycles TTS1, is written to the counting register at time 615. The counting register immediately begins counting up or down from TTS1. As TTS1 is counted, action telegram 622 arrives at peripheral 2 where its payload, action A2, is written to the shadow register at time 624. Then TTS telegram 623 arrives at peripheral 2 where its payload, number of clock cycles TTS2, is written to the counting register at time 625. This counting register immediately begins counting up or down from TTS2. Although (in fact, because) the deadline times for peripheral 1 and peripheral 2 are the same $T_{d1,2}$, TTS2 is different from TTS1. TTS2 is shortened to compensate for the later transmission of telegrams 622 and 623 down the SSB.

The counting register of peripheral 1 reaches zero at time 617, to be followed by the virtually instantaneous writing of action A1 to the function-control register, 616, and execution of action A1, 618. The counting register of peripheral 2 reaches zero at time 627 (which in this example is equal to time 617) to be followed by the virtually instantaneous writing of action A1 to the function-control register, 626, and execution of action A1, 628. Two simultaneous actions on different peripherals connected to the same serial bus would not be possible with telegrams that write the actions directly to the function-control register; because of the finite time it takes to send the second telegram, the second action would always be later than the first action.

The "SCLK" row of FIG. 6A also illustrates a feature of some SSB standards that may affect the process: clock pulses 622 coinciding with beginnings or ends of telegrams may be suppressed or "swallowed" (symbolized by the dotted outlines of some of the clock pulses). Two examples are the "sequence start condition" (SSC) of the MIPI RFFE standard and the "start, stop and restart" of the I²C standard. Normally, the counting registers on the peripherals only count up or down in response to clock pulses; any swallowed pulses could throw off the count and result in a timing error for the action execution. To prevent this undesirable result, the system-controller may temporarily speed up the clock, fitting one or more extra pulses into the time interval to replace the swallowed pulses; this compensation will be completely transparent to the peripherals. An alternative solution is to offset the value in the counting register by the number of swallowed pulses after each clock interruption.

FIG. 6B is a timing diagram for the case of two time-critical actions of the same function to be executed on the same counting register, shadow register and function-control register of the same peripheral. As illustrated, these two actions are scheduled for deadline times $Td_1$ and $Td_2$, which are separated by less time than it takes to transmit telegrams 652 and 653 for the second action. In a system that writes the actions directly to the function-control registers for immediate execution, this would be impossible without an extra bus between the system controller and peripheral 1.

In some embodiments, the time protocol engine on the system controller detects when two consecutive actions addressed to the same peripheral at deadline times separated by less than the time to send the second pair of telegrams through the SSB. Upon detecting this condition, the two action telegrams and the first TTS telegram are treated normally, but the second TTS telegram is given a difference time-to-strobe dTTS=TTS2−TTS1 instead of the normally calculated TTS2.

The system controller sends telegrams 642 and 643 for the first action, followed by telegrams 652 and 653 for the second action, through the SSB. Action code A1 is written to the shadow register of peripheral 1 at time 644, and TTS1 is written to the counting register of peripheral 1 at time 645, one telegram-duration after time 644. The counting register immediately starts the count 647 (in the illustrated example, a countdown). However, when telegrams 652 and 653 arrive at peripheral 1, the shadow register is already occupied by A1 waiting for $Td_1$, and the counting register is already busy counting up or down from TTS1 toward $Td_1$. In this event, telegrams 652 and 653 are held temporarily in peripheral 1's reception buffer 631. Alternatively, there may be dedicated FIFO buffers for the shadow register and the counting register, in which case A2 is written to the shadow-register buffer and dTTS is written to the counting-register buffer.

At $Td_1$, the count 647 for TTS1 reaches the triggering value of zero; A1 is written to peripheral 1's function-control register and immediately executed. This being done, the shadow register and the counting register become free, allowing telegrams 652 and 653 to be released from the buffer(s), action code A2 to be written to the shadow register at time 654, and dTTS to be written to the counting register at time 655. For visibility, time 655 is later than time 654 in the illustration, but in practice they may be virtually simultaneous. At $Td_2$, the count 657 for dTTS reaches the triggering value of zero, and A2 is written to the function-control register and immediately executed precisely at the intended deadline. This is another scenario where the decoupling of the transmission timing from the execution timing allows the system greater flexibility.

Although this example described two closely spaced time-critical actions, the same approach can be used for three or more closely spaced time-critical actions, whether the actions are performed by the same peripheral or by different peripherals on the same bus.

The preceding Description and accompanying Drawings describe example embodiments in detail to aid understanding. However, the scope of the claims may cover equivalents, permutations, and combinations that are not explicitly described herein.

We claim:

1. A system controller, comprising:
   a microcontroller to generate a first message, the first message to comprise a flag to indicate a type of a first action, and a payload including an action code for the first action, with a first deadline time when the first action is of a timing-critical type, or without a deadline time when the first action is of a timing-noncritical type, the first deadline time is expressed as a system time, and wherein when the first action is of a timing-critical type, the first action is to be performed based on the first deadline time by a peripheral device coupled with the microcontroller via a serial bus; and
   a time protocol engine coupled to the microcontroller to convert the first deadline time from the system time to a first number of bus-clock cycles.

2. The system controller of claim 1, wherein at least part of the first message is to be transmitted over the serial bus during an idle time of the serial bus.

3. The system controller of claim 1, further comprising a transmission buffer; wherein a first bit of the first message is to be transmitted over the serial bus at a fixed delay time after the first message is to be written to the transmission buffer.

4. The system controller of claim 1, further comprising a transmission buffer;
   wherein the microcontroller is to further generate a time-independent message; and wherein the time protocol engine is to pass the time-independent message to the transmission buffer without alteration.

5. The system controller of claim 1, wherein the first message is to comprise a time-dependent telegram and a time-independent telegram;
wherein a value of an identifying bit in each of the time-dependent telegram and the time-independent telegram is to identify the telegram as time-dependent or time-independent;
wherein the time-independent telegram is to comprise the first action; and
wherein the time-dependent telegram is to comprise the first deadline time expressed as a system time before being converted by the time protocol engine.

6. The system controller of claim 5, further comprising a transmission buffer; wherein the identifying bit is to be removed from each of the time-dependent telegram and the time-independent telegram before the first message is to be written to the transmission buffer.

7. The system controller of claim 1, further comprising a bus clock to produce a clock signal;
wherein at least one bus-clock cycle is to be intentionally suppressed after the first message is generated and before the first action is executed; and
wherein a speed of the bus clock is to be increased to compensate for the intentionally suppressed cycles of the bus clock.

8. The system controller of claim 1, further comprising a bus clock to produce a clock signal; wherein the clock signal is to be transmitted through the serial bus until the deadline time passes.

9. A peripheral, comprising:
a counting register to receive, from a system controller coupled with the peripheral via a serial bus, a first message that includes a flag to indicate a type of an action, and a payload including an action code for the action, with a deadline time when the action is of a timing-critical type, or without a deadline time when the action is of a timing-noncritical type, the deadline time is expressed as a number of bus-clock cycles for the action, the counting register further to store the number of bus-clock cycles contained in the first message, to sense cycles of a bus-clock signal, and to change the stored number by a constant increment based on the sensing of the cycles, wherein the constant increment is positive or negative; and
a function control register to receive the action when the counting register reaches a triggering value;
wherein the action is to be executed by the peripheral immediately after being written to the function control register.

10. The peripheral of claim 9, wherein the first message comprises a time-dependent telegram and a time-independent telegram.

11. The peripheral of claim 10, wherein the time-dependent telegram comprises the number of bus-clock cycles, and wherein the time-independent telegram comprises the action.

12. The peripheral of claim 9, wherein the constant increment is to be −1.

13. The peripheral of claim 9, wherein the triggering value is to be 0.

14. The peripheral of claim 9, wherein the number of bus-clock cycles are to be intentionally suppressed after the first message is to be transmitted and before the action is to be executed; and wherein the counting register is to offset a stored value by the number of the intentionally suppressed cycles before reaching the triggering value.

15. A system, comprising:
a system controller to generate a first message;
a first peripheral; and
a serial bus connecting the system controller and the first peripheral;
wherein the system controller comprises a transmitter to transmit the first message to the first peripheral over the serial bus;
wherein the first message comprises a flag to indicate a type of an action, and a portion including an action code for the action, with a first deadline time when the action is of a timing-critical type, or without a deadline time when the action is of a timing-noncritical type, the first deadline time is expressed as a system time;
wherein the portion is to associate an address of the first peripheral with the action to be executed by the first peripheral;
wherein the system controller is to transmit the portion of the first message in advance of the first deadline time; and
wherein the first peripheral is to temporarily store the portion until the first deadline time, and then to execute the action at the first deadline time.

16. The system of claim 15, wherein the serial bus is to be a synchronous serial bus and the first peripheral is to detect the arrival of the first deadline time by counting cycles of a bus clock.

17. The system of claim 16, wherein the first peripheral comprises a counting register;
wherein a count value written in the counting register is to change by a constant increment after each cycle of the bus clock;
wherein the constant increment may be positive or negative; and
wherein the count value is to reach a triggering value at the first deadline time.

18. The system of claim 17, wherein the first peripheral further comprises a shadow register and a function control register;
wherein the first peripheral is to temporarily store the action in the shadow register until the count value reaches a triggering value;
wherein the first peripheral is to copy the action from the shadow register to the function control register when the count value reaches the triggering value; and
wherein the first peripheral is to execute the action immediately after copying the action to the function control register.

19. The system of claim 17, further comprising a second peripheral connected to the serial bus and receiving a bus-clock signal;
wherein the system controller is to generate a second message to associate an address of the second peripheral with a second action and a second deadline time;
wherein the system controller is to transmit the second message through the serial bus to the second peripheral before the second deadline time; and
wherein the second peripheral is to temporarily store at least part of the second message until the second deadline time, and then to execute the action at the second deadline time.

20. The system of claim 19, wherein the system controller is to continue to send the bus-clock signal until both the first deadline time and the second deadline time have passed.

21. The system of claim 19, wherein a difference between the first deadline time and the second deadline time is to be less than a time to transmit the second message through the serial bus.

22. The system of claim 19, wherein a difference between the first deadline time and the second deadline time is to be zero.

23. The system of claim 19, wherein the system controller is to generate a third message to associate an address of the first peripheral with a third action and a third deadline time;
   wherein the system controller is to transmit the third message through the serial bus to the first peripheral before the third deadline time; and
   wherein the first peripheral is to temporarily store at least part of the third message until the third deadline time, and then to execute the action at the third deadline time.

24. The system of claim 17, wherein the first message is to associate the first peripheral address with a first action to be executed at a first deadline time and with a second action to be executed at a second deadline time later than the first deadline time;
   wherein the first peripheral comprises a receiving buffer;
   wherein the first peripheral is to calculate a deadline interval equal to a difference between the first deadline time and the second deadline time;
   wherein the first peripheral is to keep the second action in the receiving buffer while the counting register is to count up or down to the triggering value at the first deadline time, causing the first peripheral to execute the first action at the first deadline time; and
   wherein the counting register subsequently is to count up or down from the deadline interval to reach the triggering value at the second deadline time, to cause the first peripheral to execute the second action at the second deadline time.

25. The system of claim 24, wherein the deadline interval is to be shorter than a time it takes the system controller to send the first message comprising the first action, the first deadline time, the second action, and the second deadline time.

26. A non-transitory machine-readable information storage medium comprising code that, when executed, causes a machine to:
   generate a first message including a flag to indicate a type of a first action, and a first payload including a first action code for the first action, with a deadline time when the first action is of a timing-critical type, or without a deadline time when the first action is of a timing-noncritical type, the deadline time is expressed as a system time to be converted into a first number of clock cycles;
   generate a first action telegram comprising an address of a first shadow register in a first peripheral and the first action code;
   generate a first timing telegram comprising an address of a first counting register in the first peripheral and the first number of clock cycles;
   transmit the first action telegram and the first timing telegram through a synchronous serial bus to the first peripheral;
   write the first action code to the first shadow register;
   write the first number of clock cycles to the first counting register;
   change a value in the first counting register by a constant increment after each subsequent cycle of a bus clock;
   when the value in the first counting register is to reach a triggering value, write the first action code to a function-control register of the first peripheral; and
   immediately execute the first action corresponding to the first action code.

27. The non-transitory machine-readable information storage medium of claim 26, wherein the first timing telegram is to be generated by a process comprising:
   retrieval of a first stored deadline time to execute the first action;
   retrieval of a stored travel time for the first timing telegram to travel from a transmission buffer through the synchronous serial bus and to be written to the first counting register;
   measurement of a system time when the first timing telegram is to be sent to a transmission buffer;
   subtraction of the system time and the travel time from the first deadline time to produce a first time interval; and
   conversion of the first time interval to units of clock cycles to produce the first number of clock cycles.

28. The non-transitory machine-readable information storage medium of claim 26, further comprising code that, when executed, causes the machine to:
   initially include a type identifier in at least one of the first action telegram or the first timing telegram, wherein the type identifier is to distinguish timing telegrams from non-timing telegrams; and
   subsequently read the type identifier and process the first timing telegram differently from the first action telegram.

29. The non-transitory machine-readable information storage medium of claim 28, wherein the type identifier is to be a single bit.

30. The non-transitory machine-readable information storage medium of claim 28, wherein the type identifier is to be initially included and subsequently read before the first action telegram and the first timing telegram are to be transmitted through the synchronous serial bus; and
   further comprising code that, when executed, causes the machine to remove the type identifier after the first timing telegram is to be processed differently from the first action telegram and before the first action telegram and the first timing telegram are to be transmitted through the synchronous serial bus.

31. The non-transitory machine-readable information storage medium of claim 26, further comprising code that, when executed, causes the machine to:
   generate a second action telegram comprising an address of a second shadow register of a second peripheral and a second action code;
   generate a second timing telegram comprising an address of a second counting register of the second peripheral and a second number of clock cycles;
   transmit the second action telegram and the second timing telegram through the synchronous serial bus to the second peripheral;
   write the second action code to the second shadow register;
   write the second number of clock cycles to the second counting register;
   subtract 1 from a value in the second counting register after each subsequent cycle of the bus clock;
   when the value in the second counting register is to become zero, write the second action code to a function-control register of the second peripheral; and
   immediately execute a second action that is to correspond to the second action code.

32. The non-transitory machine-readable information storage medium of claim 31, wherein a difference between the second number of clock cycles and the first number of clock cycles is to be less than a number of clock cycles to transmit the second action telegram and the second timing telegram through the synchronous serial bus to the second peripheral.

33. The non-transitory machine-readable information storage medium of claim 26, further comprising code that, when executed, causes the machine to:
  generate a second action telegram comprising an address of the first shadow register and a second action code;
  generate a second timing telegram comprising an address of the first counting register and a second number of clock cycles,
    wherein a difference between the second number of clock cycles and the first number of clock cycles is to be less than a number of clock cycles to transmit the second action telegram and the second timing telegram through the synchronous serial bus;
  replace the second number of clock cycles in the second timing telegram with a third number of clock cycles;
    wherein the third number of clock signals is to equal the difference between the second number of clock cycles and the first number of clock cycles;
  transmit the second action telegram and the second timing telegram through the synchronous serial bus;
  write the second action code to the first shadow register after the first action is executed; write the third number of clock cycles to the first counting register after the first action is executed;
  subtract 1 from a value in the first counting register after each subsequent cycle of the bus clock;
  when the value in the first counting register is to equal zero, write the second action code to a function-control register of the first peripheral; and
  immediately execute a second action corresponding to the second action code.

\* \* \* \* \*